(12) United States Patent
Kawashima (10) Patent No.: US 10,958,594 B2
(45) Date of Patent: Mar. 23, 2021

(54) NETWORK CONTROL SYSTEM

(71) Applicant: Yoshihiro Kawashima, Kanagawa (JP)

(72) Inventor: Yoshihiro Kawashima, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/274,353

(22) Filed: Feb. 13, 2019

(65) Prior Publication Data
US 2019/0280990 A1 Sep. 12, 2019

(30) Foreign Application Priority Data
Mar. 7, 2018 (JP) .............................. JP2018-040969

(51) Int. Cl.
| | | |
|---|---|---|
| *H04L 12/947* | (2013.01) | |
| *H04L 12/707* | (2013.01) | |
| *H04L 12/931* | (2013.01) | |
| *H04L 12/741* | (2013.01) | |
| *H04L 12/717* | (2013.01) | |

(52) U.S. Cl.
CPC .............. *H04L 49/25* (2013.01); *H04L 45/22* (2013.01); *H04L 45/24* (2013.01); *H04L 45/42* (2013.01); *H04L 45/745* (2013.01); *H04L 49/40* (2013.01)

(58) Field of Classification Search
CPC ......... H04L 49/25; H04L 45/22; H04L 45/24; H04L 45/42; H04L 45/745; H04L 49/40; H04L 49/00; H04L 45/00; G06F 13/00
See application file for complete search history.

(56) References Cited

U.S. PATENT DOCUMENTS

| | | | | |
|---|---|---|---|---|
| 5,790,775 A | * | 8/1998 | Marks ................. | G06F 11/1658 714/5.11 |
| 5,793,764 A | * | 8/1998 | Bartoldus ............. | H04L 45/742 370/390 |
| 2010/0118337 A1 | * | 5/2010 | Kiuchi ................. | G06F 3/1205 358/1.15 |

(Continued)

FOREIGN PATENT DOCUMENTS

| | | |
|---|---|---|
| JP | 2003-167809 | 6/2003 |
| JP | 2005-039466 | 2/2005 |

*Primary Examiner* — Chi H Pham
*Assistant Examiner* — Ji-Hae Yea
(74) *Attorney, Agent, or Firm* — Harness, Dickey & Pierce, P.L.C.

(57) ABSTRACT

A network control system includes a network controller, and an information processor connected to the network controller via a first communication path complying with a first standard. The network controller is connected to an external device via an another communication path complying with the first standard. In response to receiving a packet from a transmission source that is registered in advance, the network controller transfers the packet to the information processor via the first communication path. When the packet transferred from the network controller is a special packet that is registered in advance, the information processor notifies the network controller of a content of an instruction indicated by the special packet via a second communication path. The network controller generates a special packet including the content of the instruction notified from the information processor, and transmits the generated special packet to the external device via the another communication path.

17 Claims, 11 Drawing Sheets

(56) References Cited

U.S. PATENT DOCUMENTS

| | | | |
|---|---|---|---|
| 2012/0069391 A1* | 3/2012 | Yonezawa | G06F 3/121 |
| | | | 358/1.15 |
| 2015/0026233 A1* | 1/2015 | Kawana | G06F 9/547 |
| | | | 709/202 |
| 2015/0139238 A1* | 5/2015 | Pourzandi | H04L 45/64 |
| | | | 370/392 |
| 2016/0352731 A1* | 12/2016 | Mentze | H04L 63/0876 |

* cited by examiner

TABLE 1

| DOMAIN NAME | EQUIPMENT NAME | MAC ADDRESS | IP ADDRESS |
|---|---|---|---|
| LAN1 | MANAGEMENT PC | AA-BB-CC-DD-EE-FF | 192.168.1.2 |

FIG. 3B

TABLE 2

| DOMAIN NAME | EQUIPMENT NAME | MAC ADDRESS | IP ADDRESS |
|---|---|---|---|
| LAN2 | NAS | BB-CC-DD-EE-FF-AA | 192.168.2.1 |
| LAN2 | SERVER 2 | ... | 192.168.2.2 |
| LAN3 | SERVER 1 | ... | 192.168.3.1 |
| LAN3 | PC3 | ... | 192.168.3.2 |

TABLE 3

| DOMAIN NAME | EQUIPMENT NAME | MAC ADDRESS | IP ADDRESS |
|---|---|---|---|
| LAN1 | MANAGEMENT PC | AA-BB-CC-DD-EE-FF | 192.168.1.2 |

FIG. 9B

TABLE 4

| PATTERN NO. | CONTENT OF PROCESS | CONTENT OF PACKET | CONTROL LINE A | CONTROL LINE B |
|---|---|---|---|---|
| 1 | LOG ACQUISITION | 0x10101010 | High | Low |
| 2 | EQUIPMENT OPERATION STATUS ACQUISITION | 0x55555555 | Low | High |

FIG. 9C

TABLE 5

| DOMAIN NAME | EQUIPMENT NAME | MAC ADDRESS | IP ADDRESS | PATTERN NO. |
|---|---|---|---|---|
| LAN2 | MACHINE TOOL1 | CC-DD-EE-FF-AA-BB | 192.168.2.1 | 2 |
| LAN2 | MACHINE TOOL2 | ... | 192.168.2.2 | 2 |
| LAN2 | ROBOT 1 | ... | 192.168.2.3 | 2 |
| LAN2 | ROBOT 2 | ... | 192.168.2.4 | 2 |
| LAN2 | PC 1 | ... | 192.168.2.5 | 1 |
| LAN2 | PC 2 | ... | 192.168.2.6 | 1 |
| LAN3 | MACHINE TOOL 3 | ... | 192.168.3.1 | 2 |
| LAN3 | MACHINE TOOL4 | ... | 192.168.3.2 | 2 |
| LAN3 | ROBOT 3 | ... | 192.168.3.3 | 2 |
| LAN3 | ROBOT 4 | ... | 192.168.3.4 | 2 |
| LAN3 | PC 3 | ... | 192.168.3.5 | 1 |
| LAN3 | PC 4 | ... | 192.168.3.6 | 1 |

NETWORK CONTROL SYSTEM

CROSS-REFERENCE TO RELATED APPLICATION

This patent application is based on and claims priority pursuant to 35 U.S.C. § 119(a) to Japanese Patent Application No. 2018-040969, filed on Mar. 7, 2018, in the Japan Patent Office, the entire disclosure of which is hereby incorporated by reference herein.

BACKGROUND

Technical Field

The present disclosure relates to a network control system.

Description of the Related Art

In offices, factories, and the like, when operating a plurality of networks having different security levels, operation is often carried out in which each domain is completely separated in view of security. On the other hand, there is a demand to centrally collect information on devices connected to a network or managing power supplies of the devices.

SUMMARY

A network control system includes a network controller, and an information processor connected to the network controller via a first communication path complying with a first standard. The network controller is connected to an external device via an another communication path complying with the first standard. In response to receiving a packet from a transmission source that is registered in advance, the network controller transfers the packet to the information processor via the first communication path. When the packet transferred from the network controller is a special packet that is registered in advance, the information processor notifies the network controller of a content of an instruction indicated by the special packet via a second communication path different from the first communication path. The network controller generates a special packet including the content of the instruction notified from the information processor, and transmits the generated special packet to the external device via the another communication path.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, although the present disclosure will be described with reference to embodiments, the present disclosure is not limited to the embodiments described below. In each of the drawings referred to below, same reference numerals are used for common elements, and a description thereof is omitted as appropriate.

First Embodiment

Figure 1:
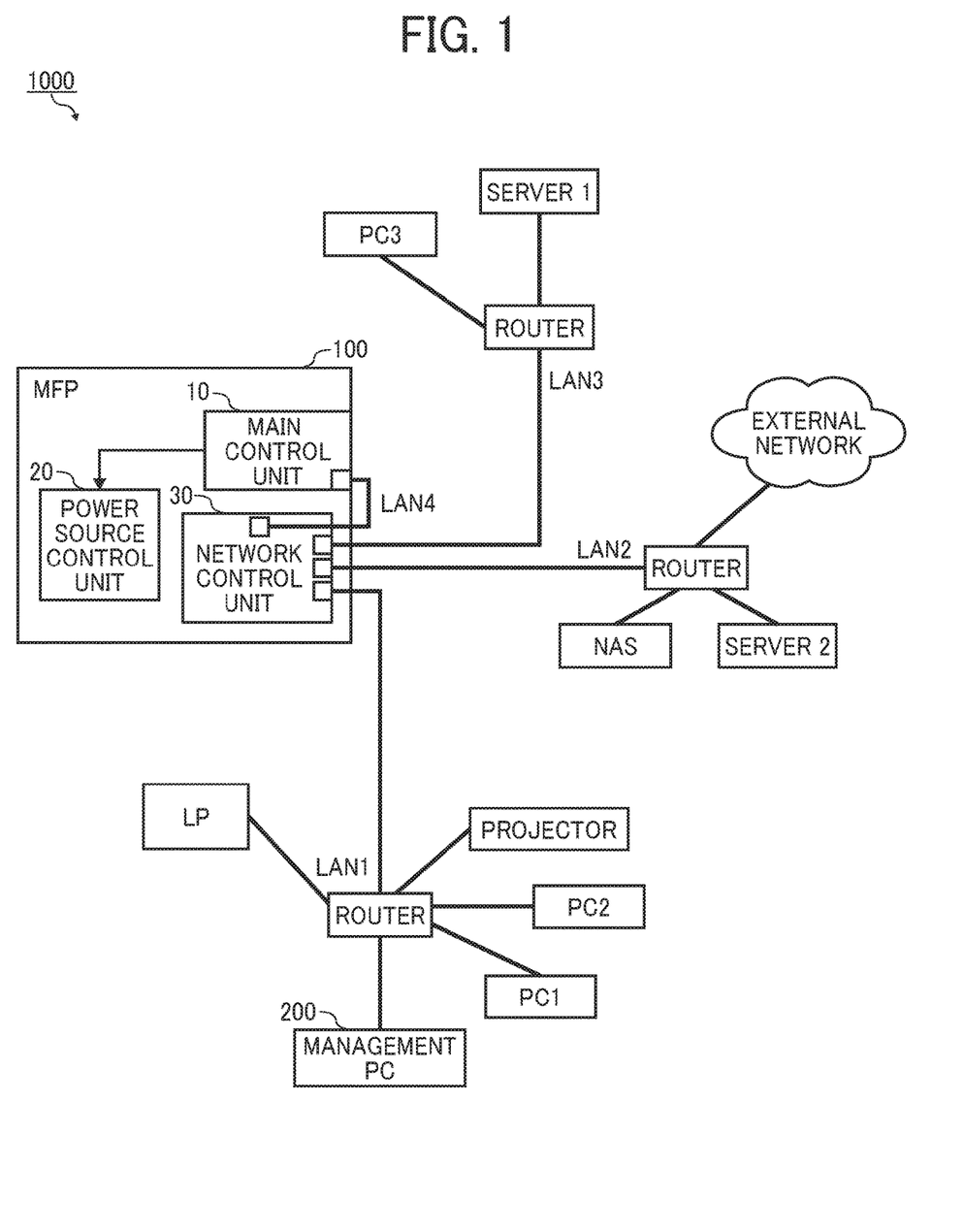
FIG. 1 is a diagram illustrating a configuration of a network including a network control system (Multi Function Printer (MFP)) according to a first embodiment of the present disclosure.

FIG. 1 illustrates a configuration of a network 1000 including an MFP (Multi Function Printer) 100 referred to as a first embodiment of a network control system of the present disclosure. The network 1000 includes three local area networks (LANs) having different security levels.

In view of security, LANs 1 to 3 are separated by Software Defined Networking (SDN) or the like using Openlow technology. A management PC 200, a personal computer (PC) 1, a PC 2, a projector, and a laser printer (LP) are connected to the LAN 1. A network-attached storage (NAS) and a server 2 are connected to the LAN 2. A PC 3 and a server 1 are connected to the LAN 3.

The MFP 100 of this embodiment is a network-capable image forming apparatus shared by devices in the network 1000. The MFP 100 includes a main control unit 10 and a network control unit 30.

The network control unit 30 is connected to external devices (the PC 1, the PC 2, the projector, the laser printer, the NAS, the server 2, the PC 3, and the server 1) via the three LANs 1 to 3 and is connected to a LAN port of the main control unit 10 via a LAN 4. The LANs 1 to 4 are communication paths in compliance with the same communication standard (Transmission Control Protocol (TCP)/Internet Protocol (IP) protocol).

In addition, the network control unit 30 transfers, only a specific packet among the packets transmitted from each of the LANs 1 to 3, to the main control unit 10 via the LAN 4, while the network control unit 30 blocks other packets in view of security. Examples of the specific packet transferred to the main control unit 10 via the LAN 4 include a print request packet transmitted from the PCs 1 to 3 and a special packet for power control transmitted from the management PC 200.

Next, an internal configuration of the MFP 100 of this embodiment is described with reference to FIG. 2.

Figure 2:
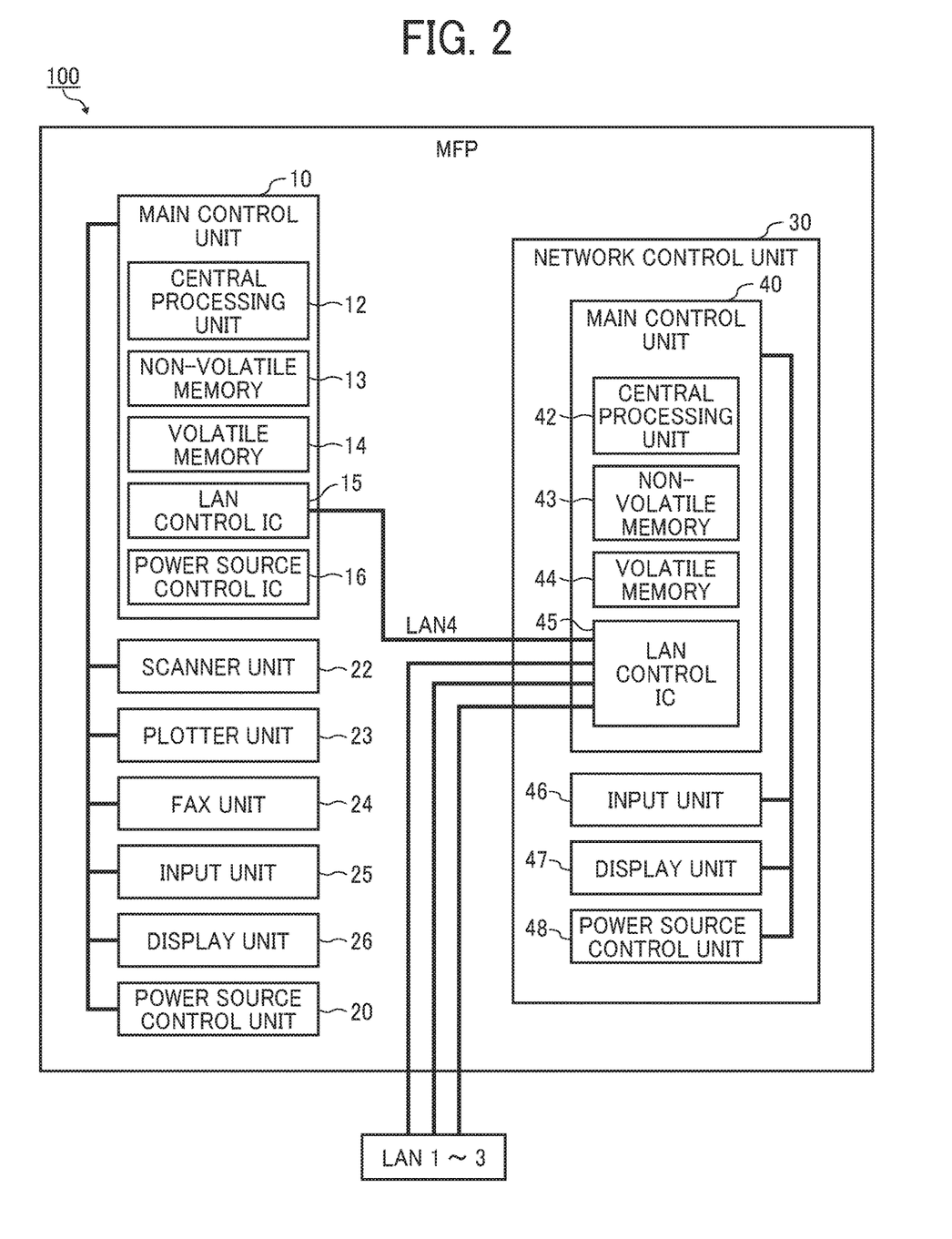
FIG. 2 is a diagram illustrating an internal configuration of a network control system (MFP) according to the first embodiment of the present disclosure.

As illustrated in FIG. 2, in addition to the main control unit 10 and the network control unit 30 described above, the MFP 100 of this embodiment includes a power source control unit 20 that supplies DC power to each unit and performs ON/OFF control of a power source, a scanner unit 22 that optically scans a document to generate scanned image data, a plotter unit 23 that executes image formation output on a paper, a fax unit 24 that performs a facsimile communication, an input unit 25 that accepts various operation inputs, and a display unit 26 that displays various operation/setting screens.

The main control unit 10 includes a central processing unit 12 that controls each unit, a non-volatile memory 13 that stores a program used for an operation of the MFP 100, a volatile memory 14 that deploys a program that is read from the non-volatile memory 13 by the central processing unit 12 at a time of startup, a LAN control integrated circuit (IC) 15 that controls the LAN, and a power source control IC 16 that notifies the power source control unit 20 of a power source ON/OFF signal.

In this embodiment, power is constantly supplied to the LAN control IC 15 and the power source control IC 16 of the main control unit 10.

The network control unit 30 includes a main control unit 40, an input unit 46 that accepts various inputs, a display unit 47 that displays various setting information, and the like, and a power source control unit 48 that supplies DC power to each unit and performs ON/OFF control of a power source.

The main control unit 40 includes a central processing unit 42 that controls each unit, a non-volatile memory 43 that stores a program used for a network operation and tables that will be described later, a volatile memory 44 that deploys a program that is read from the non-volatile memory 13 by the central processing unit 42 at a time of startup, and a LAN control IC 45 that controls the LAN.

In this embodiment, power is constantly supplied to the power source control unit 48 and the LAN control IC 45 of the main control unit 40.

Figure 3A:
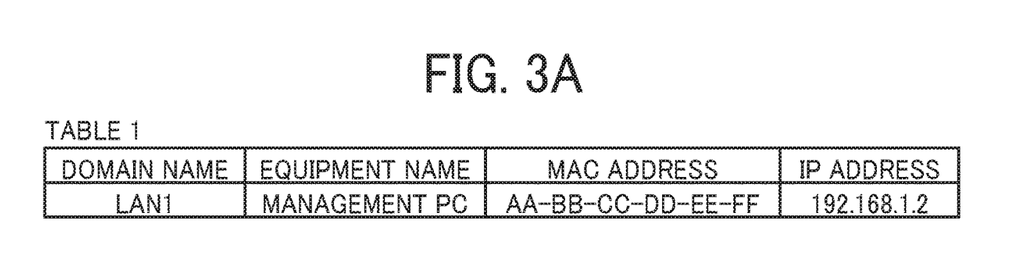
FIGS. 3A and 3B are diagrams illustrating two tables included in a network control unit, according to an embodiment of the present disclosure.
Figure 3B:
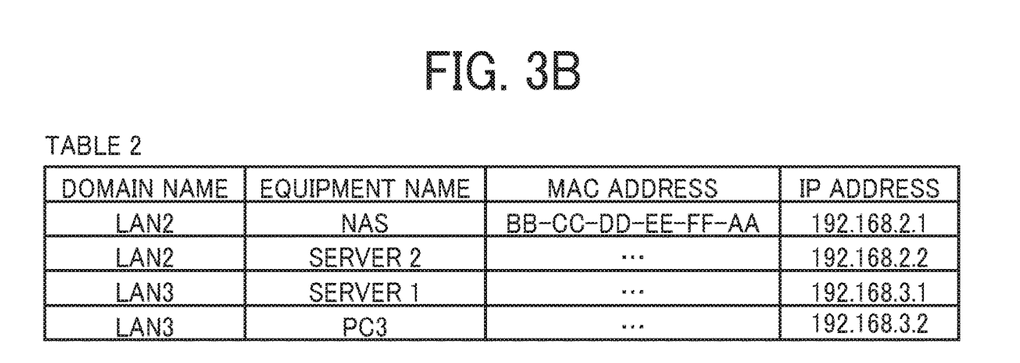

FIGS. 3A and 3B illustrate two tables stored in the non-volatile memory 43 of the network control unit 30. A table 1 is a table for registering the management PC 200, which is a source of transmission of the special packet to be transferred to the main control unit 10 by the network control unit 30 via the LAN 4. For example, the table 1 stores attribute information of the management PC 200 such as a domain to which the management PC 200 belongs, a device name, a MAC address, and an IP address. On the other hand, a table 2 is a table for registering devices belonging to a domain different from the domain to which the management PC 200 belongs. For example, the table 2 stores, for each of the devices, attribute information of the device such as a name of the domain to which the device belongs, a device name, a MAC address, and IP address.

The internal configuration of the MFP 100 according to this embodiment has been described above. Next, content of a power source OFF process that the MFP 100 executes when receiving a special packet (hereinafter referred to as a power source OFF packet) that the management PC 200 instructs to turn off a power source will be described with reference to a flowchart illustrated in FIG. 4. In the following description, reference is made to FIGS. 1 and 2 where appropriate.

Figure 4:
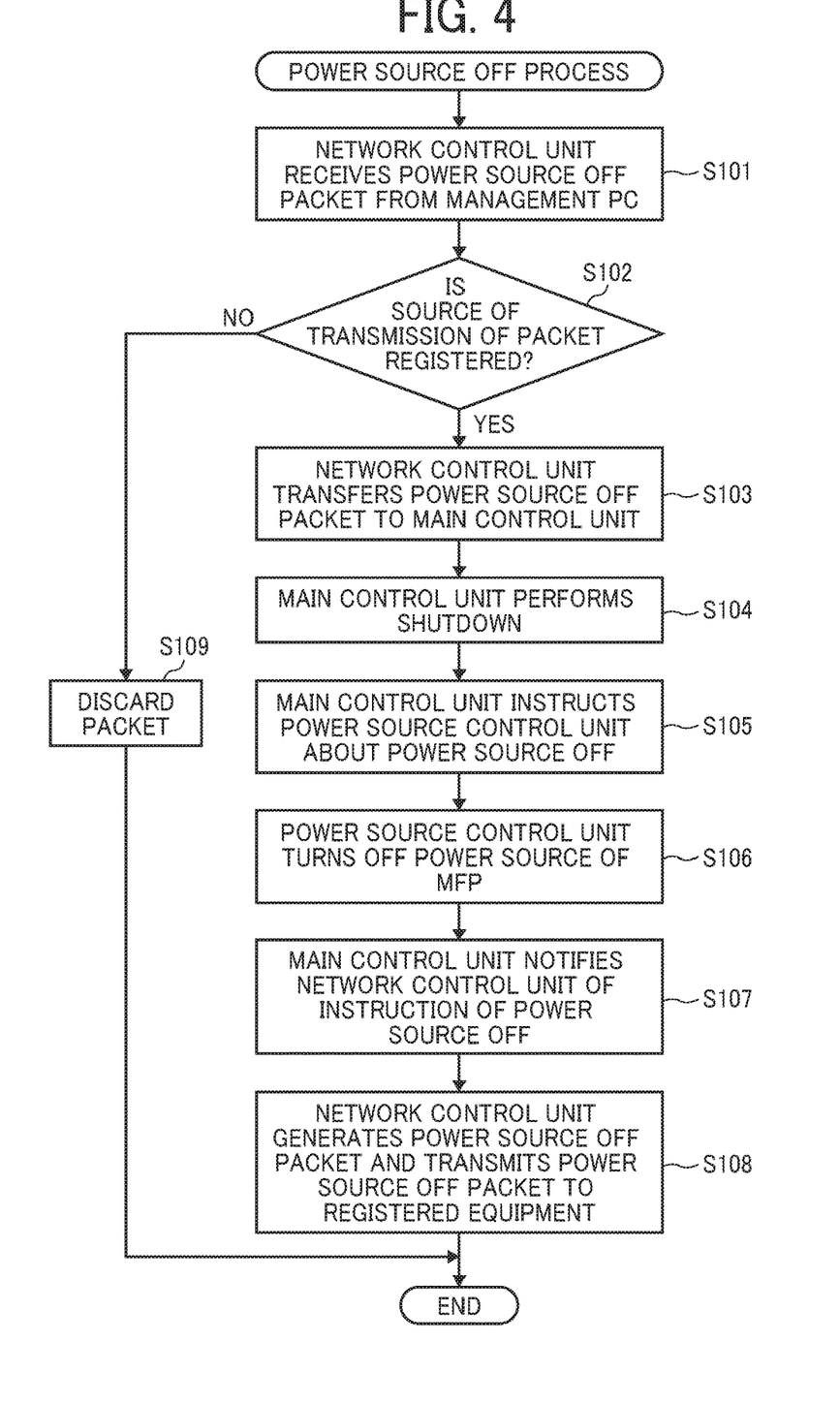
FIG. 4 is a flowchart illustrating a power source OFF process, according to an embodiment of the present disclosure.

First, in step 101, the network control unit 30 receives a power source OFF packet from the management PC 200.

In the following step 102, the network control unit 30 refers to the table 1 (FIG. 3A) stored in the non-volatile memory 43 and determines whether a source of transmission of the packet is registered in the table 1. Specifically, presence/absence of the registration is determined on the basis of whether the MAC address included in header information of the received packet matches the MAC address of the management PC 200 stored in the table 1.

When the source of transmission of the packet is not registered in the table 1 (No in step 102), in the following step 109, the received packet is discarded and the process is terminated. By contrast, when the source of transmission of the packet is registered in the table 1 (Yes in step 102), the process proceeds to step 103.

In the following step 103, the network control unit 30 transfers the power source OFF packet received from the management PC 200 only to the main control unit 10 via the LAN 4 (in other words, the network control unit 30 does not transfer the packet to a domain other than the LAN 4).

In the following step 104, the main control unit 10 having received the power source OFF packet executes a sequence of shutdown on the basis of a program stored in the non-volatile memory 13. At this time, power supply to the LAN control IC 15 and the power source control IC 16 of the main control unit 10 and the power source control unit 20 is maintained.

When the shutdown sequence is completed, in the following step 105, the main control unit 10 sends an instruction of power source OFF, and in the following step 106, the power source control unit 20 turns off a power source of the MFP 100.

Figure 6:
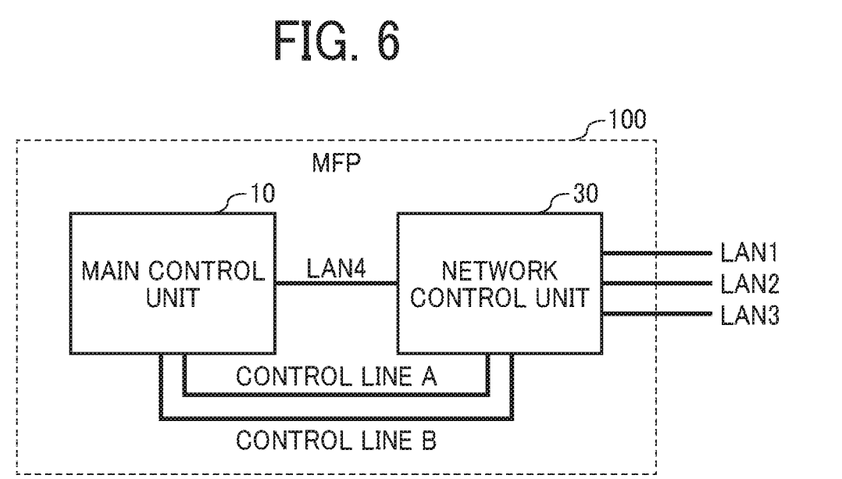
FIG. 6 is a diagram illustrating a control line that connects a main control unit and a network control unit, according to an embodiment of the present disclosure.

In the following step 107, the main control unit 10 notifies the network control unit 30 of an instruction of power source OFF via a communication path complying with a standard different from the communication standard of the LAN 4 (TCP/IP protocol), not via the LAN 4. In this embodiment, as illustrated in FIG. 6, the main control unit 10 and the network control unit 30 are connected by two control lines A and B which output High/Low electric signals, and the main control unit 10 sets the control line A to a High level and the control line B to a Low level, thereby transmitting a control signal A indicating the instruction of power source OFF to the network control unit 30.

In the following step 108, the network control unit 30 generates the power source OFF packet including the instruction of power source OFF notified from the main control unit 10, and transmits the generated power source OFF packet to each of the devices registered in the table 2 (FIG. 3B). Specifically, the power source OFF packet is transmitted to the devices (NAS, server 2) connected to the LAN 2 and the devices (server 1, PC 3) connected to the LAN 3, and the process is terminated.

The power source OFF process executed by the MFP 100 has been described above. Next, content of a power source ON process that the MFP 100 executes when receiving a special packet (hereinafter referred to as a power source ON packet) that the management PC 200 instructs to turn on a power source will be described with reference to a flowchart illustrated in FIG. 5.

Figure 5:
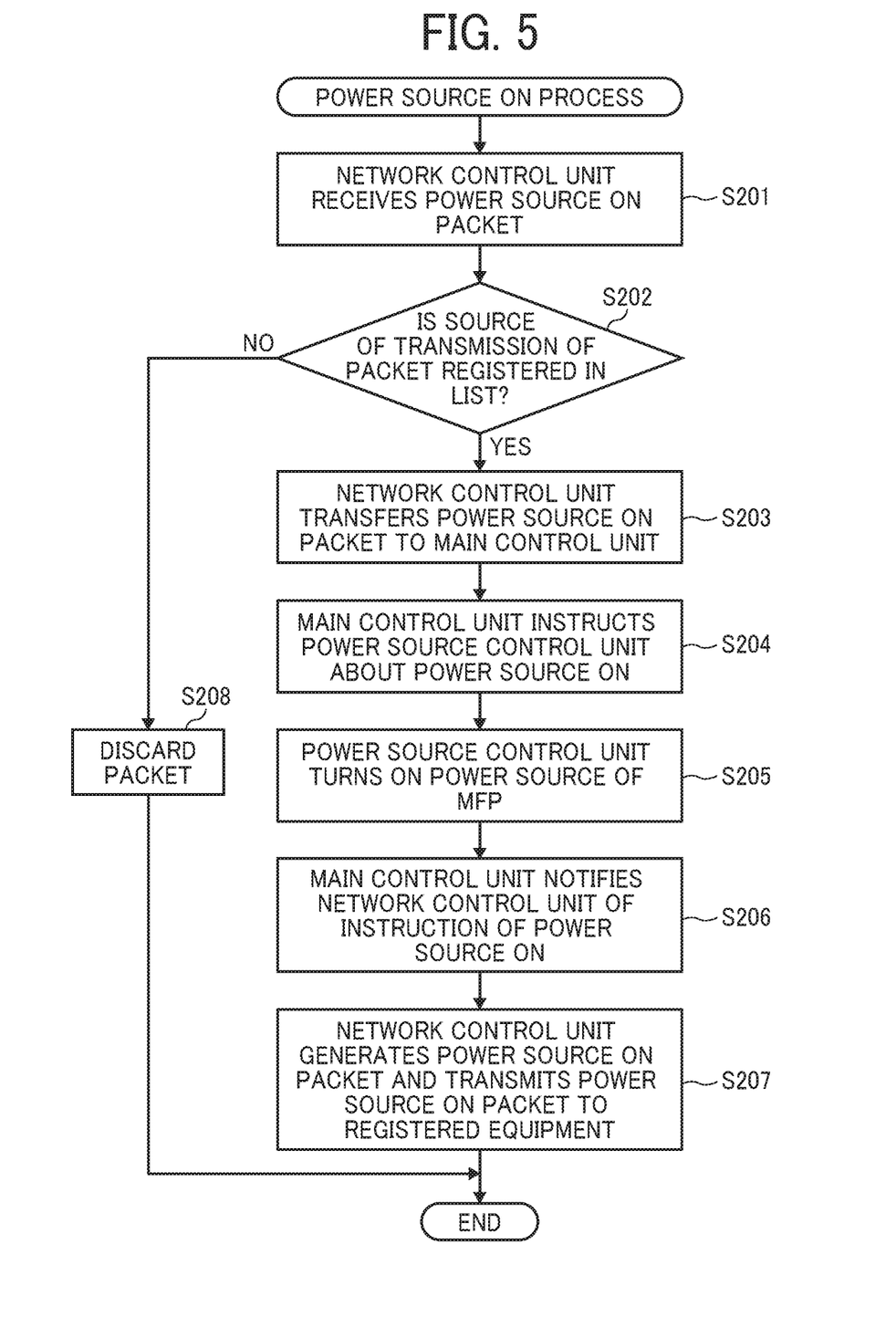
FIG. 5 is a flowchart illustrating a power source ON process, according to an embodiment of the present disclosure.

First, in step 201, the network control unit 30 receives a power source ON packet from the management PC 200.

In the following step 202, the network control unit 30 refers to the table 1 (FIG. 3A) stored in the non-volatile memory 43 and determines whether the source of transmission of the packet is registered in the table 1 by the procedure as described above.

When the source of transmission of the packet is not registered in the table 1 (No in step 202), in the following step 208, the received packet is discarded and the process is terminated. By contrast, when the source of transmission of the packet is registered in the table 1 (Yes in step 202), the process proceeds to step 203.

In the following step 203, the network control unit 30 transfers the power source ON packet received from the management PC 200 only to the main control unit 10 via the LAN 4 (in other words, the network control unit 30 does not transfer the packet to a domain other than the LAN 4).

In the following step 204, the main control unit 10 sends an instruction of power source ON to the power source control unit 20. In response to receiving this instruction, in the following step 205, the power source control unit 20 turns on the power source of the MFP 100, the central processing unit 12 calls an activation program stored in the non-volatile memory 13, and the MFP 100 starts up.

In the following step 206, the main control unit 10 notifies the network control unit 30 of an instruction of power source ON via a communication path complying with a standard different from the communication standard of the LAN 4 (TCP/IP protocol), not via the LAN 4. More specifically, the main control unit 10 sets the control line A to the Low level and the control line B to the High level, thereby transmitting a control signal B indicating the instruction of power source ON to the network control unit 30.

In the following step 207, the network control unit 30 newly generates a power source ON packet including the instruction of power source ON notified from the main control unit 10, and transmits the generated power source ON packet to each of devices (the NAS, the server 2, the server 1, and the PC 3) registered in the table 2 (FIG. 3B) and the process is terminated.

As described above, according to this embodiment, the management PC 200 can remotely control a power source of a device belonging to another domain.

In the above-described embodiment, an example is described the network control unit 30 is installed inside the MFP 100. In another example, the network control unit 30 can be provided outside the MFP 100 as a separate module.

In addition, in the above-described embodiment, an example is described in which the management PC 200 (the source of transmission of the special packet) is identified on the basis of the MAC address. In another example, the management PC 200 can be identified on the basis of other attributes that can specify the management PC 200.

Furthermore, in the above-described embodiment, an example is described in which the main control unit 10 notifies the network control unit 30 of the instruction of power source OFF by software control. In another example, the network control unit 30 autonomously detects the power-off of the MFP 100, and in response to this detection, the power source OFF packet may be generated.

The first embodiment of the present disclosure has been described above. Next, a second embodiment of the present disclosure will be described.

Second Embodiment

Figure 7:
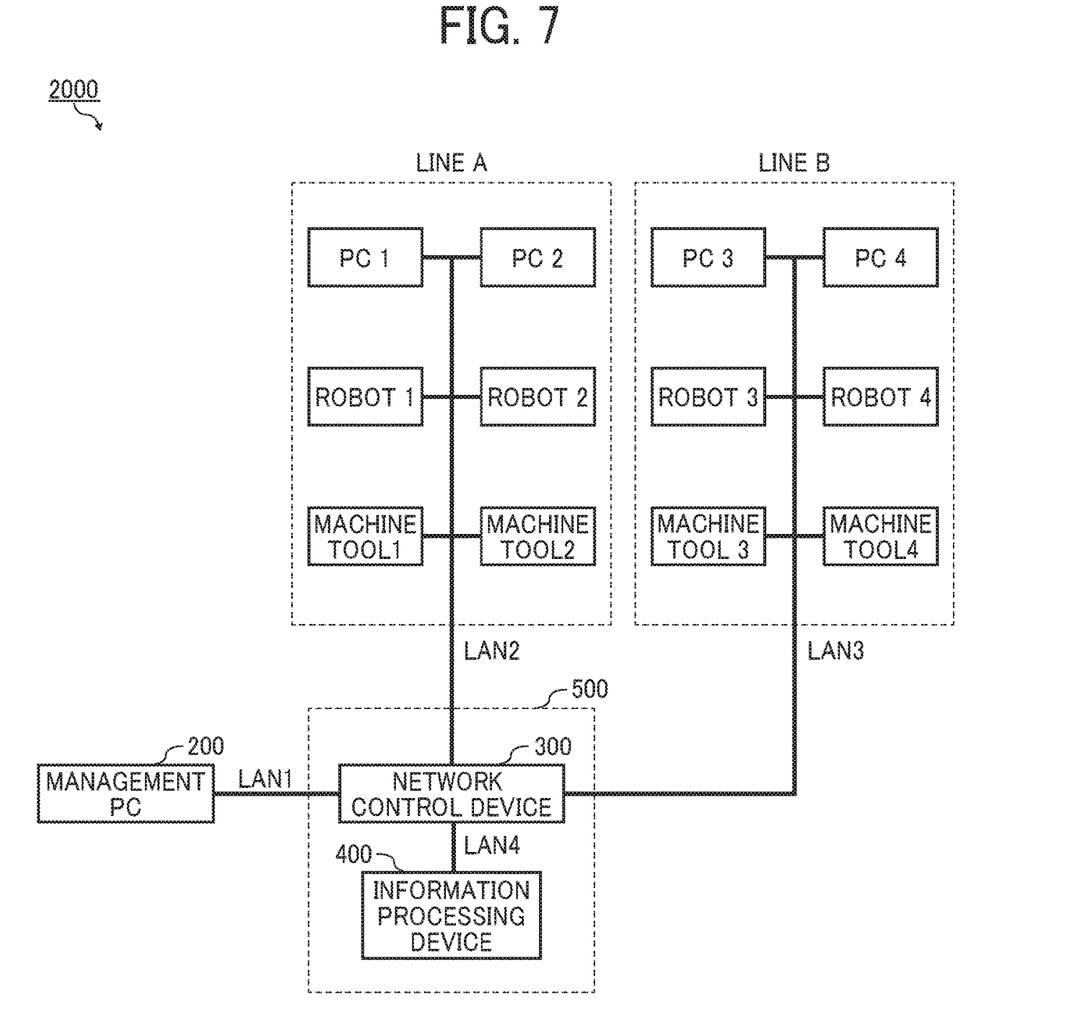
FIG. 7 is a diagram illustrating a configuration of a network including a network control system according to a second embodiment of the present disclosure.

FIG. 7 illustrates a configuration of a network 2000 in a case where a network control system 500 according to the second embodiment of the present disclosure is applied to a factory. The network 2000 includes three local area networks (LANs).

For the purpose of preventing unauthorized operations and accidents, the LANs 1 to 3 are separated by SDN or the like using Openlow technology. The management PC 200 is connected to the LAN 1. Each of devices (the PC 1, the PC 2, a robot 1, a robot 2, a machine tool 1, and a machine tool 2) belonging to a line A is connected to the LAN 2. Each of devices (the PC 3, a PC 4, a robot 3, a robot 4, a machine tool 3, and a machine tool 4) belonging to a line B is connected to the LAN 3. An information processing apparatus 400 is connected to the LAN 4.

The network control system 500 of this embodiment includes a network control apparatus 300 and the information processing apparatus 400, which are communicably connected to each other via the LAN 4.

The network control apparatus 300 is connected to external devices (the PCs 1 to 4, the robots 1 to 4, and the machining tools 1 to 4) via the three LANs 1 to 3 and is connected to the LAN port of the main control unit 10 via the LAN 4. The LANs 1 to 4 are communication paths in compliance with the same communication standard (TCP/IP protocol).

In addition, the network control apparatus 300 transfers only a specific packet among the packets transmitted from each of the LANs 1 to 3 to the information processing apparatus 400 via the LAN 4, while the network control apparatus 300 blocks other packets in view of security. Examples of the specific packet transferred to the information processing apparatus 400 via the LAN 4 includes a special packet transmitted from the management PC and a response packet for a special packet transmitted from each of the devices belonging to the lines A and B.

Next, internal configurations of the information processing apparatus 400 and the network control apparatus 300 will be described with reference to FIG. 8.

Figure 8:
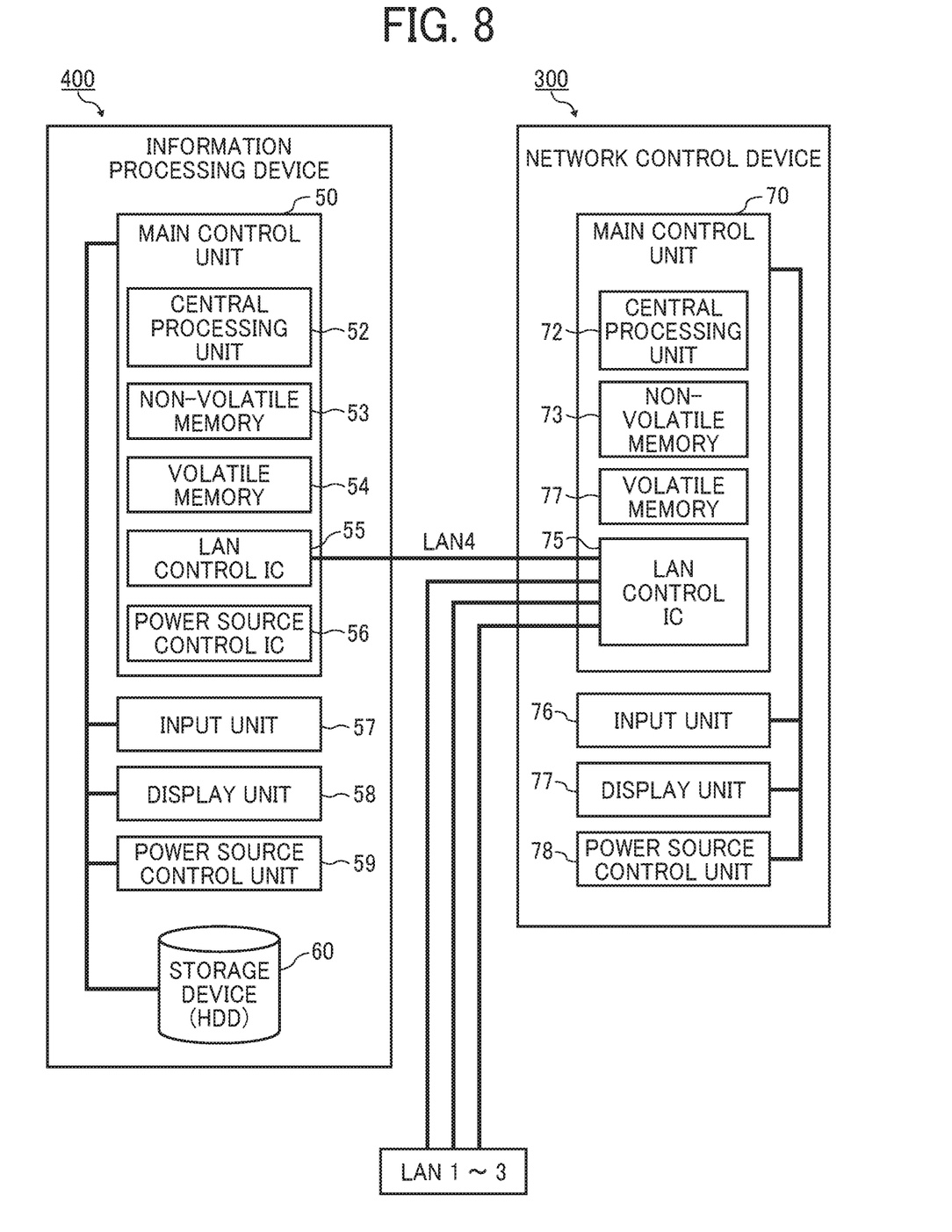
FIG. 8 is a diagram illustrating an internal configuration of a network control system according to the second embodiment of the present disclosure.

As illustrated in FIG. 8, the information processing apparatus 400 includes a main control unit 50, a power source control unit 59 that supplies DC power to each unit and performs ON/OFF control of a power source, an input unit 57 that accepts various operation inputs, and a display unit 58 that displays various operation/setting screens, and in addition to these, a non-volatile storage device 60. The storage device 60 can be constituted by two or more hard disk drives (HDDs), and in this case, Redundant Arrays of Independent Disks (RAID) may be utilized for data protection.

The main control unit 50 includes a central processing unit 52 that controls each unit, a non-volatile memory 53 that stores a program used for an operation of the information processing apparatus 400, a volatile memory 54 that deploys a program that is read from the non-volatile memory 53 by the central processing unit 52 at a time of startup, a LAN control IC 55 that controls the LAN, and a power source control IC 56 that notifies the power source control unit 59 of a power source ON/OFF signal.

The network control apparatus 300 includes a main control unit 70, an input unit 76 that accepts various inputs, a display unit 77 that displays various setting information, and the like, and a power source control unit 78 that supplies DC power to each unit and performs ON/OFF control of a power source.

In addition, the main control unit 70 includes a central processing unit 72 that controls each unit, a non-volatile memory 73 that stores a program used for a network operation and tables that will be described later, a volatile memory 74 that deploys a program that is read from the non-volatile memory 53 by the central processing unit 72 at a time of startup, and a LAN control IC 75 that controls the LAN.

Figure 9A:
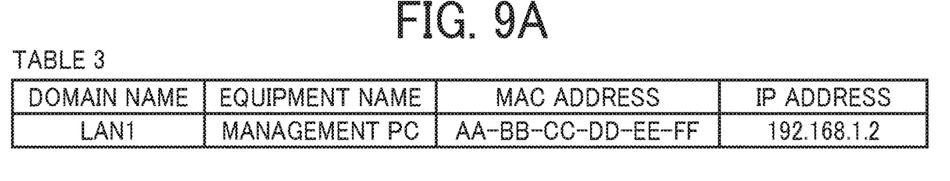
FIGS. 9A to 9C are diagrams illustrating three tables included in a network control apparatus, according to an embodiment of the present disclosure.
Figure 9B:
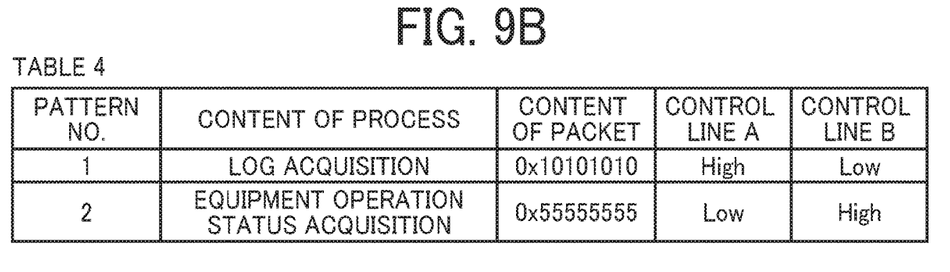
Figure 9C:
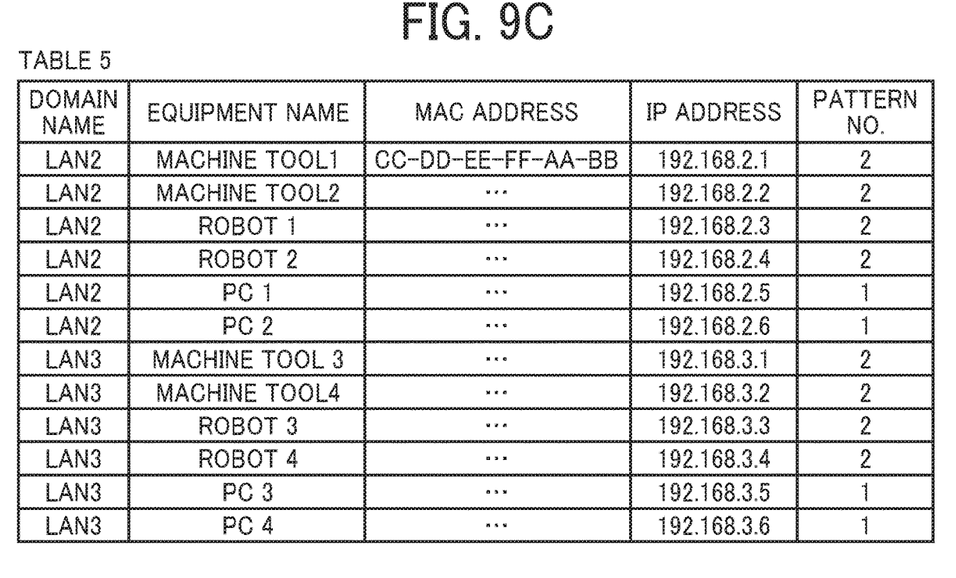

FIGS. 9A to 9C illustrate three tables stored in the non-volatile memory 73. A table 3 is a table for registering the management PC 200, which is a transmission source of the special packet to be transferred to the main control unit 10 by the network control apparatus 300 via the LAN 4. For example, the table 3 stores attribute information of the management PC 200 such as a name of a domain to which the management PC 200 belongs, a device name, a MAC address, and an IP address. A table 4 is a table for registering the special packet, and stores content of process instructed by the packet, content of the packet, and a logic of the two control lines A and B (described later). A table 5 is a table for registering a device as a destination of transmission of the special packet. For example, the table 5 stores, for each of the devices belonging to the line A and the line B, attribute information of the device, such as a name of a domain to which the device belongs, a device name, a MAC address, an IP address, and a pattern number of the special packet that the device can handle.

The internal configurations of the information processing apparatus 400 and the network control apparatus 300 according to this embodiment have been described above. Next, content of a device information acquisition process executed cooperatively by the information processing apparatus 400 and the network control apparatus 300 when the management PC 200 sends various special packets related to acquisition of device information will be described with reference to a flowchart illustrated in FIG. 10. In the following description, reference is made to FIGS. 7 and 8 where appropriate.

Figure 10:
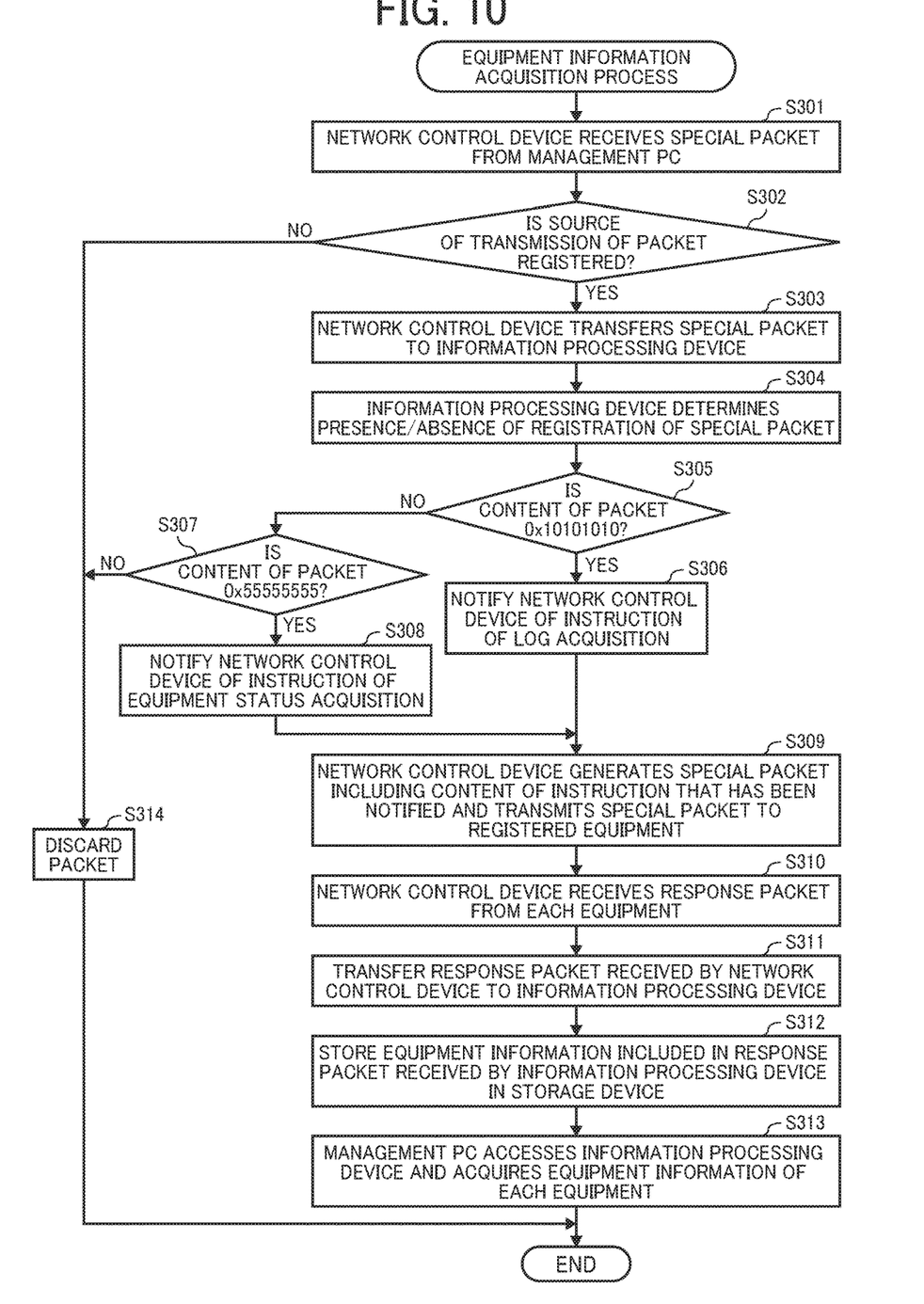
FIG. 10 is a flowchart illustrating a device information acquisition process, according to an embodiment of the present disclosure.

First, in step 301, the network control apparatus 300 receives a special packet from the management PC 200.

In the following step 302, the network control apparatus 300 refers to the table 3 (FIG. 9A) stored in the non-volatile memory 73 and determines whether a source of transmission of the packet is registered in the table 3 by the same procedure as described in the first embodiment.

When the source of transmission of the packet is not registered in the table 3 (No in step 302), in the following step 314, the received packet is discarded and the process is terminated. By contrast, when the source of transmission of the packet is registered in the table 3 (Yes in step 302), the process proceeds to step 303.

In the following step 303, the network control apparatus 300 transfers the special packet received from the management PC 200 only to the information processing apparatus 400 via the LAN 4 (in other words, the network control apparatus 300 does not transfer the packet to a domain other than the LAN 4).

In the following step 304, the main control unit 50 of the information processing apparatus 400 determines whether the received special packet is registered in the table 4 (FIG. 9B) stored in the non-volatile memory 73.

Figure 11:
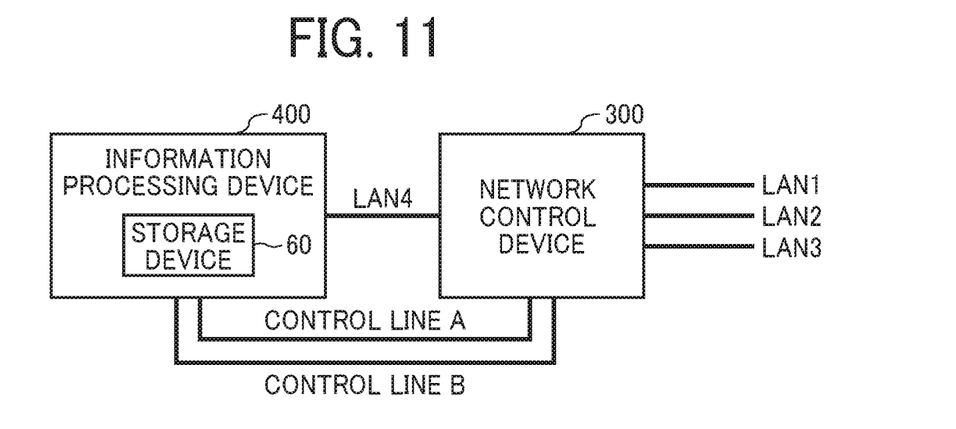
FIG. 11 is a diagram illustrating a control line that connects an information processing apparatus and the network control apparatus, according to an embodiment of the present disclosure.

When the received special packet is registered as a packet (0×10101010) instructing acquisition of a log (Yes in step 305), in the following step 306, the main control unit 50 of the information processing apparatus 400 notifies the network control apparatus 300 of an instruction of log acquisition via a communication path complying with a standard different from the communication standard of the LAN 4 (TCP/IP protocol), not via the LAN 4. In this embodiment, as illustrated in FIG. 11, the information processing apparatus 400 and the network control apparatus 300 are connected by two control lines A and B which output High/Low electric signals, and the information processing apparatus 400 sets the control line A to a High level and the control line B to a Low level on the basis of values in the table 4 (FIG. 9B), thereby transmitting a control signal A indicating the instruction of log acquisition to the network control apparatus 300.

By contrast, when the received special packet is registered as a packet (0×55555555) instructing acquisition of an operation status of a device (No in step 305, then Yes in step 307), in the following step 308, the main control unit 50 of the information processing device apparatus notifies the network control apparatus 300 of an instruction of acquisition of the device operation status via a communication path complying with the standard different from the communication standard of the LAN 4 (TCP/IP protocol), not via the LAN 4. Specifically, the information processing apparatus 400 sets the control line A to the Low level and the control line B to the High level on the basis of the values in the table 4 (FIG. 9B), thereby transmitting a control signal B indicating the instruction of acquisition of the device operation status to the network control apparatus 300.

By contrast, when the received special packet is not registered in the table 4 (No in step 305, then No in step 307), in the following step 314, the received packet is discarded and the process is terminated.

In step 309 subsequent to step 306 or step 308, the network control apparatus 300 newly generates a special packet including content of the instruction notified from the information processing apparatus 400. Specifically, when the control signal A is received, the network control apparatus 300 generates a packet instructing the log acquisition (hereinafter referred to as a log acquisition packet). When the control signal B is received, the network control apparatus 300 generates a packet instructing acquisition of the device operation status (hereinafter referred to as a device operation status acquisition packet). After that, the network control apparatus 300 transmits the generated special packet to each of the devices (the PCs 1 to 4, the robots 1 to 4, and the machine tools 1 to 4) registered in the table 5 (see FIG. 9C).

Each of the devices belonging to the lines A and B that has received the special packet from the network control apparatus 300 generates a response packet including device information (log file or operation status file) instructed by the received packet and transmits the response packet to the network control apparatus 300.

In response to this transmission, in step 310, the network control apparatus 300 receives the response packet from each of the devices belonging to the lines A and B. In the following step 311, the network control apparatus 300 transfers the received response packet only to the information processing apparatus 400 via the LAN 4 (in other words, the network control apparatus 300 does not transfer the packet to a domain other than the LAN 4).

In the following step 312, the information processing apparatus 400 stores, the device information included in the received response packet, in the storage device 60.

In response to storing process, in the following step 313, the management PC 200 accesses the information processing apparatus 400 via the LAN 1 and acquires the device information stored in the storage device 60.

As described above, according to this embodiment, the management PC 200 can acquire the device information of each of the devices belonging to the lines A and B belonging to the different domain. This reduces man-hours for managing devices while ensuring security.

While the present disclosure has been described with reference to the embodiments, the present disclosure is not limited to the embodiments described above.

For example, while in the above-described embodiments, an example is described in which an information processor (the main control unit 10, the information processing apparatus 400) notifies a network controller (the network control unit 30, the network control apparatus 300) of the content of the instruction by the High/Low level of the two control lines. In another example, multiple pieces of content of an instruction can be notified by transmitting different pulse signals on a single control line, or can be notified by using a general-purpose serial communication standard such as Universal Serial Bus (USB) and Universal Asynchronous Receiver/Transmitter (UART).

In still another example, the network controller can generate a special packet by utilizing pattern matching, can generate a packet with software, or can generate a packet by hardware control such as Application Specific Integrated Circuit (ASIC).

Other than that is included in the scope of the present disclosure as long as the action and the effect of the present disclosure are exhibited within a scope of embodiment, which can be contemplated by a person skilled in the art.

Each function of the above-described embodiments can be implemented by a program written in C, C++, C#, Java (Registered Trademark), etc. Programs of the embodiments can be stored in a recording medium such as a hard disk device, a CD-ROM, an MO, a DVD, a flexible disk, an EEPROM, and an EPROM, and can be distributed, and can be transmitted via a network in a form available for other devices.

Conventionally, a technique is known that remotely controls a power supply of a device connected to a network or monitor the state of a device connected to a network.

However, the conventional technique is applicable on the assumption that the device to be controlled or monitored remotely belongs to the same domain where a management apparatus that performs the remote control or monitor. In other words, according to the conventional technique, a device that resides in the different domain from the domain where the management apparatus resides cannot be remotely controlled.

According to one or more embodiments of the present disclosure, a network control system is provided that can centrally manage devices that reside in a plurality of different domains.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. A network control system, comprising:
a network controller including first processing circuitry, the network controller connected to an external device via a first communication path complying with a first standard; and
an information processor including second processing circuitry, the information processor connected to the network controller via a second communication path complying with the first standard, the first communication path being part of a first local area network and the second communication path being part of a second local area network separate from the first local area network, wherein
the first processing circuitry is configured to cause the network controller to receive a packet from a registered transmission source, and transfer the packet to the information processor via the second communication path,
the second processing circuitry is configured to cause the information processor to determine whether the packet is a command packet, and notify the network controller of a content of an instruction indicated by the command packet via a third communication path when the packet is the command packet, the third communication path being different from the first and second communication paths, and
the first processing circuitry is configured to cause the network controller to generate a notification packet including the content of the instruction, and transmit the notification packet to the external device via the first communication path.

2. The network control system according to claim 1, wherein
the first processing circuitry is further configured to cause the network controller to receive a response packet for the notification packet from the external device, and transfer the response packet to the information processor via the first communication path, and
the second processing circuitry is further configured to cause the information processor to store content of the response packet in a storage device.

3. The network control system according to claim 1, wherein
the third communication path is a control line configured to output high and low electric signals.

4. The network control system according to claim 1, wherein
the third communication path is a communication path complying with a serial communication standard.

5. The network control system according to claim 2, wherein the third communication path is a control line configured to output high and low electric signals.

6. The network control system according to claim 2, wherein
the third communication path is a communication path complying with a serial communication standard.

7. The network control system according to claim 1, wherein the network controller further comprises:
a non-volatile memory storing a first table, wherein
the first processing circuitry is further configured to cause the network controller to determine whether the command packet was sent from the registered transmission source based on the first table.

8. The network control system according to claim 7, wherein the first table includes a media access control address of the registered transmission source.

9. The network control system according to claim 7, wherein
the non-volatile memory further stores a second table, the second table including attributes of devices belonging to a domain different from a domain including the transmission source, and
the first table includes attributes of the registered transmission source.

10. The network control system according to claim 1, wherein the first standard is TCP/IP.

11. The network control system according to claim 1, wherein the first communication path and the second communication path are separated by software defined networking.

12. The network control system according to claim 1, wherein the instruction is one of a power on or a power off instruction.

13. An information processing apparatus for securely controlling a device over a network, the information processing apparatus comprising:
a network controller including first processing circuitry, the network controller connected to an external device via a first communication path complying with a first standard; and
an information processor including second processing circuitry, the information processor connected to the network controller via a second communication path complying with the first standard, the first communication path being part of a first local area network and the second communication path being part of a second local area network separate from the first local area network, wherein
the first processing circuitry is configured to cause the network controller to receive a packet from a registered transmission source, and transfer the packet to the information processor via the second communication path,
the second processing circuitry is configured to cause the information processor to determine whether the packet is a command packet, and notify the network controller of a content of an instruction indicated by the command packet via a third communication path when the packet is the command packet, the third communication path being different from the first and second communication paths, and
the first processing circuitry is configured to cause the network controller to generate a notification packet including the content of the instruction, and transmit the notification packet to the external device via the first communication path.

14. The information processing apparatus according to claim 13, wherein
the first processing circuitry is further configured to cause the network controller to receive a response packet for the notification packet from the external device, and transfer the response packet to the information processor via the first communication path, and
the second processing circuitry is further configured to cause the information processor to store content of the response packet in a storage device.

15. The information processing apparatus according to claim 13, wherein
the third communication path is a control line configured to output high and low electric signals.

16. The information processing apparatus according to claim 13, wherein
the third communication path is a communication path complying with a serial communication standard.

17. The information processing apparatus according to claim 13, wherein the network controller further comprises:
a non-volatile memory storing a first table, wherein
the first processing circuitry is further configured to cause the network controller to determine whether the command packet was sent from the registered transmission source based on the first table.

* * * * *